Figure 1:
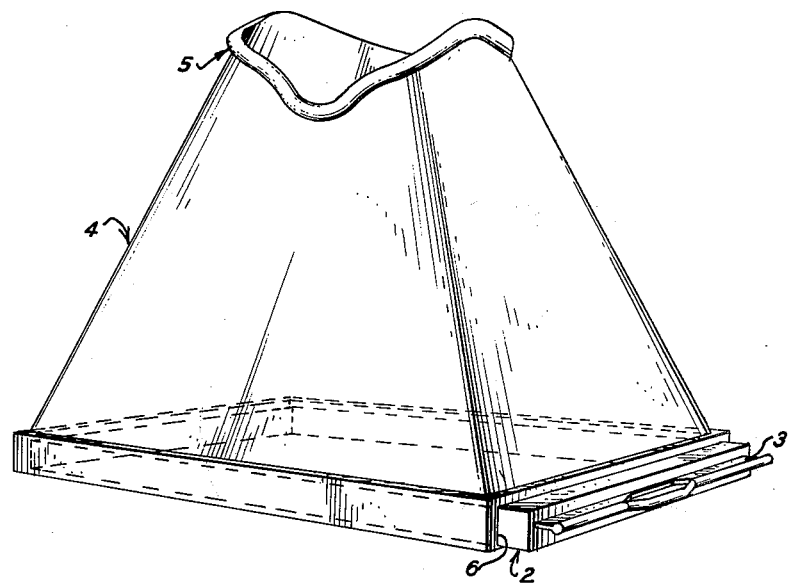

May 26, 1964 A. D. BERSUSAN ET AL 3,134,900
APPARATUS FOR PRODUCING OPTICAL X-RAY IMAGES
Filed Oct. 7, 1960

United States Patent Office 3,134,900
Patented May 26, 1964

3,134,900
APPARATUS FOR PRODUCING OPTICAL
X-RAY IMAGES
Arthur David Bensusan, 7 St. Pauls Road, and Herman Israel Solomon, 30 11th Ave., both of Houghton, Johannesburg, Transvaal, Republic of South Africa
Filed Oct. 7, 1960, Ser. No. 84,743
1 Claim. (Cl. 250—78)

This invention relates to the production of photographic images, X-ray images and the like by using phosphorescent material such as luminous compounds (phosphors) which are chemical compositions usually containing sulphides of elements such as zinc, cadmium or alkaline earths activated by traces of other elements; and which temporarily emit visible after-glow when the source of excitation has ceased; and which in compatible media are applied to surfaces suitable for the use and application hereunder described (example—paper, plastic, metal, glass) and hereinafter for the sake of brevity referred to as "glow-sheet."

An object of this invention is to produce immediate X-ray images on a glow-sheet so as to give immediate X-ray diagnoses, and thereby saving valuable time at present expended on processing. It will be appreciated that when a person is injured he has to be taken to a doctor and then sent to be X-rayed to ascertain if he has a fracture or other injury. By using the method according to this invention it will be possible for doctors to keep the apparatus constructed according to this invention in their consulting rooms or to carry it to a patient's house or other place, and there in conjunction with X-ray or equivalent equipment to obtain an immediate photographic image of the suspected fracture or other injury.

A further object of this invention is to produce a photographic image on a glow-sheet in place of film, paper or other light sensitive emulsion by means of a camera, enlarger, projector, or via optical or non-optical systems, and its subsequent application for all photographic purposes where an immediate image is required, employing natural or artificial light or any other rays.

According to the invention a method of producing temporary photographic images of an object on a glow-sheet by exposure of the glow-sheet to light or other source of excitation.

A further method according to this invention consists of producing temporary X-ray images of an object for the purpose of giving an immediate X-ray diagnosis, and consists of the formation of an image of the object on a glow-sheet by the passage of X-rays through the object to be examined on to the glow-sheet. A further feature of the invention is the production of a permanent record of the abovementioned temproary images whereby the permanent record of the temporary image on the glow-sheet is made by optical or non-optical means on to film, paper or other light sensitive emulsion.

Apparatus used according to this invention for producing temporary X-ray images consists of a casette or the like with a glow-sheet contained therein; a movable opaque sheet or sheath (through which X-rays are capable of penetrating) located above the glow-sheet, the sheath being capable of covering or exposing the glow-sheet; a viewing member adapted to be used in conjunction with the casette so as to exclude extraneous light from the image on the glow-sheet.

Figure 2:
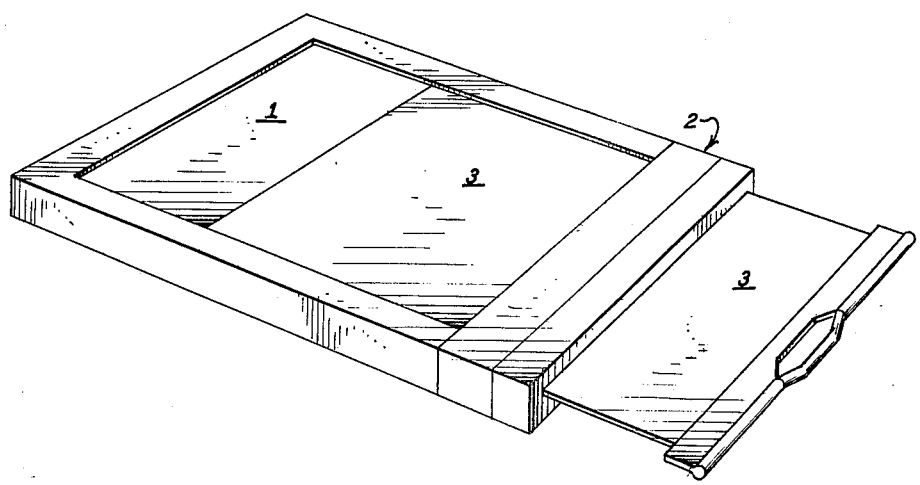

In order that the invention may be more clearly understood and carried into practice reference is now made to the accompanying drawings:

FIGURE 1 is a perspective view of a viewing member and casette constructed according to the invention; and FIGURE 2 is a perspective view showing the casette separate from the viewing member.

In the drawings numeral 1 is a sheet of glow-paper (glow-sheet) located at the bottom of a casette 2, a sliding opaque sheath 3 being located above the glow-sheet 2. A viewing member or viewing box 4 is shown having an eye-shielded opening 5 at one end and a slot 6 adjacent the other end. The slot 6 is located at right-angles to the axis of the viewing box and as shown in FIGURE 1 it has the casette slideably located within the slot.

Alternatively, the viewing box 4 is made as a separate unit to the casette 2 and is hinged to the casette along one edge of the box so that the box may be swung clear of the face of the casette or may be closed over the casette to exclude extraneous light. Alternatively, the box can be made so as to slide across the face of the casette so as to open or close the two parts in relation to each other.

In operation the casette 2 is removed from the viewing box 4, the sliding sheath 3 is pushed in so as to cover the glow-sheet 1, the object to be X-rayed is placed on top of the casette, an X-ray unit is placed above the apparatus and X-rays are passed through the object on to the glow-sheet 1, and thereafter the casette is pushed into the slot 6 in the viewing box 4 so as to exclude any extraneous light. The sheath 3 is then pulled out to expose the glow-sheet 1 so that the image on the glow-sheet may be clearly seen by a person looking into the viewing box.

This image can be permanently recorded by photographing it either by means of a camera or by direct contact process, and such apparatus can be incorporated into the viewing box as additional equipment.

It will be appreciated that when an X-ray is taken according to this invention in the light, an opaque sheet is required, but if an X-ray is taken in the dark then an opaque sheet is not required. Also, both the method and apparatus above described for producing temporary X-ray images on a glow-sheet can be used for any other purpose—such as commercial or industrial use where an immediate X-ray image is required.

In order to produce photographic images on glow-sheets an exposure is made by means of a camera with the glow-sheet acting as the sensitized emulsion. An exposure is then made and a clear half-tone positive image is produced on the glow-sheet. A copy photograph of this image can then be made in the usual way.

We claim:

Apparatus for creating an optical image of an object, comprising: a casette; a plane surface coated with a phosphorescent material of the type sensitive to stimulation by X-radiation disposed within one end of said casette; a movable sheet opaque to light but relatively transparent to X-radiation disposed in removable relation to said plane surface; a source of X-radiation; and a viewing member constructed to exclude light from the image on the plane surface, said viewing member comprising a closed elongated viewing box having an eye-shielded opening at one end and a slot adjacent the other end, the slot being located at right angles to the axis of the viewing box and adapted to hold the casette.

References Cited in the file of this patent

UNITED STATES PATENTS

| | | |
|---|---|---|
| 984,520 | Campbell | Feb. 14, 1911 |
| 1,563,856 | Hirsch | Dec. 1, 1925 |
| 1,629,950 | Campbell | May 24, 1927 |
| 2,399,424 | Bliss | Apr. 30, 1946 |
| 2,433,129 | Land | Dec. 23, 1947 |
| 2,475,596 | Dawson | July 12, 1949 |
| 2,482,815 | Urbach | Sept. 27, 1949 |